United States Patent [19]
Daly et al.

[11] Patent Number: 5,878,141
[45] Date of Patent: Mar. 2, 1999

[54] COMPUTERIZED PURCHASING SYSTEM AND METHOD FOR MEDIATING PURCHASE TRANSACTIONS OVER AN INTERACTIVE NETWORK

[75] Inventors: Michael T. Daly, Redmond; Thomas A. Grate, Issaquah, both of Wash.

[73] Assignee: Microsoft Corporation, Redmond, Wash.

[21] Appl. No.: 519,846

[22] Filed: Aug. 25, 1995

[51] Int. Cl.⁶ .............................. H04K 1/00; G06F 17/60
[52] U.S. Cl. .............................. 380/25; 380/24; 235/379; 705/17
[58] Field of Search ................................... 380/4, 23, 24, 380/25, 30, 49; 235/379, 380; 379/90.01, 93.12, 93.19, 93.25; 705/1, 5, 7, 17, 40; 902/22, 24

[56] References Cited

U.S. PATENT DOCUMENTS

| | | | |
|---|---|---|---|
| 3,852,571 | 12/1974 | Hall et al. | 235/379 |
| 4,528,643 | 7/1985 | Freeny, Jr. | 364/468 |
| 4,594,663 | 6/1986 | Nagata et al. | 705/17 |
| 4,823,264 | 4/1989 | Deming | 235/379 X |
| 4,960,981 | 10/1990 | Benton et al. | 235/379 |
| 5,053,956 | 10/1991 | Donald et al. | 705/17 X |
| 5,283,731 | 2/1994 | Lalonde et al. | 705/1 |
| 5,319,705 | 6/1994 | Halter et al. | 380/4 |
| 5,336,870 | 8/1994 | Hughes et al. | 235/379 |
| 5,383,113 | 1/1995 | Kight et al. | 364/401 |
| 5,404,393 | 4/1995 | Remillard | 379/93.25 |
| 5,426,281 | 6/1995 | Abecasis | 235/379 |
| 5,475,585 | 12/1995 | Bush | 235/380 X |
| 5,479,510 | 12/1995 | Olsen et al. | 380/24 |
| 5,590,197 | 12/1996 | Chen et al. | 380/24 |
| 5,592,375 | 1/1997 | Salmon et al. | 705/7 |
| 5,606,361 | 2/1997 | Davidsohn et al. | 379/93.12 X |
| 5,619,558 | 4/1997 | Jhetta | 235/379 |
| 5,661,517 | 8/1997 | Budow et al. | 348/13 |
| 5,677,955 | 10/1997 | Doggett et al. | 380/24 |

OTHER PUBLICATIONS

*Achieving Electronic Privacy*, by David Chaum, article in Scientific America downloaded from Internet., Aug. 1992.

*Preparid Smart Card Techniques: A Brief Introduction and Comparison*, Online discussion by David Chaum, Copyright 1994.

Primary Examiner—Harshad Patel
Assistant Examiner—Paul D. Amrozowicz
Attorney, Agent, or Firm—Lee & Hayes, PLLC

[57] ABSTRACT

A computerized, electronic purchase mediating system includes a purchaser database having a list of purchasers and a merchant database having a list of merchants. The purchaser database stores information about each purchaser including a set of personal payment methods that the purchaser could use to purchase goods and/or services. Similarly, the merchant database stores information about each merchant including a set of accepted payment methods that the merchant would accept for sale of the goods and/or services. The purchase system also includes a processor coupled to the purchaser and merchant databases. The processor receives a purchase request and accesses the merchant database according to a merchant identified in the purchase request to retrieve the set of accepted payment methods which corresponds to that merchant. The processor also accesses the purchaser database to retrieve the set of personal payment methods which corresponds to the identified purchaser. The processor then computes an intersection of these two sets to derive a common set of any available payment method that is both accepted by the merchant and can be used by the purchaser for purchase of the goods and/or services. The purchaser is presented with the purchase amount and the common set of available payment methods to choose a most preferred form of payment. Upon selection, the processor consummates the sale and signs a digital signature with the purchaser's permission via password verification to ensure for the merchant that a completed transaction has occurred.

55 Claims, 7 Drawing Sheets

COMPUTERIZED PURCHASING SYSTEM AND METHOD FOR MEDIATING PURCHASE TRANSACTIONS OVER AN INTERACTIVE NETWORK

TECHNICAL FIELD

This invention relates to computerized purchase systems and methods for electronically transacting a purchase of goods and/or services between a purchaser and a merchant. The invention further relates to such purchase systems and methods for facilitating purchase transactions over an interactive network, and particularly, in an interactive television system.

BACKGROUND OF THE INVENTION

In a transaction for the purchase of goods and/or services, the purchaser typically has the ability to pay for the items using any one of many different payment methods. For instance, consider the familiar situation where a purchaser in a department store wishes to buy an article of clothing. The purchaser can pay for the clothing article with cash or by check. Alternatively, the purchaser might wish to use a credit card or a debit card. Indeed, it is not uncommon for the purchaser to carry many payment options in the form of cash, a checkbook, a bank debit card, as well as many different kinds of credit cards, including cards issued by the merchants themselves (e.g., a Sears® charge card or a Nordstroms® charge card), bank issued credit cards (e.g., a SeaFirst Bank VISA® credit card or a Bank of America MasterCard® credit card), an organization-related credit card (e.g., United Airlines Mileage Plus First Card™ or an IEEE credit card), and association credit cards (e.g., Discover® and American Express®).

The department store, on the other hand, might only accept a few of these forms of payment, such as cash, local checks, its own charge card, and American Express®, while not accepting other forms of payment. The department store often posts these accepted forms of payment at the point-of-purchase counter.

During the purchase transaction of the clothing article, the purchaser mentally takes note of the forms of payment accepted by the department store. The purchaser then tenders payment using a suitable payment method. If the purchaser chooses to pay with a personal check, the sales clerk performs an authentication process. The clerk only accepts the check if it is local, if the clerk recognizes the person writing the check, or if the person presents another piece of identification (e.g., a credit card or driver's license) to verify the authenticity of that person who is offering the check.

In the event the purchaser tenders a credit card to pay for the clothing article, the sales clerk performs a check to verify that the purchaser has sufficient funds in the credit card account and has not exceeded the spending limit imposed by the issuing institution. This is typically done by passing the purchaser's credit card through a magnetic-stripe card reader, such as a Verifone® system, that is located at the point-of-purchase counter to electronically read the purchaser's account information contained in the magnetic stripe on the credit card. The purchaser's account information is validated on-line with the card issuer with respect to the purchaser's account balance and spending limit. Assuming that the verification process returns a normal status, the sales clerk accepts the tendered credit card and consummates the purchase.

The complexity of a purchase transaction increases when moved from the point-of-purchase context, where the purchaser and merchant are face-to-face, to a remote purchase context, where the merchant and purchaser are separated from one another. For example, consider another familiar transaction where a purchaser wants to buy a new lamp from a mail order catalog. The purchaser places an order for the lamp over the telephone or through the mail. The purchaser might use a credit card, enclose a check, or simply wait to be billed at the end of the month. The merchant takes an assumed risk that the ordering consumer is legitimate and that payment will be forthcoming, and based upon that assumption, ships the new lamp to the purchaser.

In these transactions, the merchant accepts a fairly high risk of not being paid (compared to other types of sales transactions) because the purchaser does not present a credit card or sign a credit card receipt. The purchaser can deny that the transaction ever occurred, leaving the merchant with the burden of proving that a transaction took place. To meet this burden, the merchant typically tries to show that the purchaser signed for receipt of the product.

In recent years, there has been a dramatic growth in the number of consumers that order goods and/or services, and then pay for them, using electronic devices. For instance, it is fairly common for a purchaser to watch a home shopping television program, choose a product, and order the product over the telephone. The product is shipped and the purchaser is billed at a later time. As another example, the viewer may purchase a special movie or event that is scheduled to be shown at a particular time, like that of the Pay-Per-View® arrangement. In this situation, the viewer orders the special program from the cable company over the telephone, typically using an automated menu, and the program is electronically sent to the viewer's own television set. The viewer is then billed at the end of the month as part of the cable bill. For another example, a computer user might wish to purchase a service from an on-line service provider whereby the user simply orders and receives the desired service electronically over a network communication system, such as Internet. Common on-line service providers include CompuServe®, Dialog®, and America On-Line®.

In addition to purchasing items using electronic devices, people are beginning to automate their payment of such items. After a good or service is received and a bill is presented, many purchasers are starting to pay their bills electronically, or through a check writing system such as the Checkfree® system. In these computerized payment systems, the consumer instructs the service provider by telephone, computer terminal, or other telecommunications to pay various bills (especially recurring, monthly bills) without the consumer having to write a check for each bill. U.S. Pat. No. 5,383,113 describes an example computerized check writing system.

With the increasing demand to electronically purchase and pay for goods and/or services, there are a number of issues that arise. For instance, the purchaser must choose a method of paying for the goods and/or services that is acceptable to the merchant. But this task is not so simple, because the purchaser most likely will not have access to payment methods that are accepted by the merchant. Unlike a point-of-purchase transaction where the accepted payment methods are often posted, the purchaser in the electronic transaction is often blind to the requirements of the merchant.

Another issues concerns how to protect the purchaser's wallet from the merchant. Given a choice, the merchant would most likely choose one particular payment method (such as using the merchant's own charge card) that the purchaser might not wish to use. Moreover, for obvious reasons, it is in the purchaser's interest not to reveal his/her bank account or credit card information to the merchant. An electronic purchasing system should block the merchant from access to the purchaser's payment options and to this confidential account information.

Another concern is protection from fraudulent transactions, both on the part of the merchant and the purchaser. For instance, how can the purchaser be sure that the merchant is authentic and truly has the represented goods or services to sell? How can the purchaser know that he/she will not be billed for more than the amount that was agreed upon? From the merchant side, how can the merchant be assured that the purchaser really exists and that payment will be forthcoming? These issues are less troublesome in a point-of-purchase context because the purchaser and merchant can see one another, the goods are often readily apparent, and payment is typically tendered on the spot. However, in an electronic purchasing system where the purchaser might live in one state or country and the seller might live in another, these issues become rather important. A suitable purchasing system should address these issues to reduce or prevent the occurrence of fraudulent transactions.

Another issue that arises in the electronic environment is whether the purchaser has sufficient funds to pay for the goods or services. Still another issue concerns how to authenticate the purchaser and merchant, as there is no opportunity for either of them to visually authenticate one another like in the point-of-purchase context.

Many of the issues raised above are born out of the difficulty and complexity of converting from a "paper-trail" purchase transaction system—where these concerns are addressed in large part through the use of paper checks, receipts, physical credit cards, debit cards, and penned signature verification—to a "paperless" computerized purchase transaction system. It is an object of this invention to provide a "paperless" electronic purchasing system which solves these above noted problems.

SUMMARY OF THE INVENTION

This invention provides an electronic computerized purchasing system that is particularly well suited for an interactive networked environment. The purchasing system permits the purchaser to choose a desired product from a particular merchant, arrange a suitable payment method, and confirm a purchase transaction all electronically and without any human interaction between the purchaser and merchant. The purchasing system of this invention mediates the purchase by providing a choice of suitable payment methods from which a purchaser can select a desired method, while preventing the merchant from gaining access to the purchaser personal payment options or account information. Additionally, the purchasing system ensures for the merchant that the purchaser has sufficient funds in the selected account, and that a fully enforceable transaction has occurred. The purchasing system of this invention also authenticates the communicating terminals and software applications to reduce or prevent fraudulent transactions.

According to one aspect of this invention, an electronic purchase mediating system includes a purchaser database having a list of purchasers and a merchant database having a list of merchants. The purchaser database stores information about each purchaser including a set of personal payment methods that the purchaser could use to purchase goods and/or services. Similarly, the merchant database stores information about each merchant including a set of accepted payment methods that the merchant would accept for sale of the goods and/or services. The purchase system also includes a processor coupled to the purchaser and merchant databases.

To make a purchase, the purchaser submits a purchase request that identifies, among other things, a merchant, a purchaser, the goods and/or services to be purchased, and a purchase amount. The processor receives the purchase request and mediates the purchase transaction. The processor and its software components are assumed to be independent of, and trusted by, both the purchaser and the merchant.

The processor accesses the merchant database according to the merchant identified in the purchase request to retrieve the set of accepted payment methods which corresponds to that merchant. The processor also accesses the purchaser database according to the purchaser identified in the purchase request to retrieve the set of personal payment methods which corresponds to that purchaser. The processor then computes an intersection of these two sets to derive a common set of any available payment method that is both accepted by the merchant and can be used by the purchaser for purchase of the goods and/or services. The purchaser is presented with the purchase amount and the common set of available payment methods to choose a most preferred form of payment. Upon selection, the processor consummates the sale and signs with the purchaser's digital signature via a password or other verification to ensure for the merchant that a completed transaction has occurred.

According to another aspect of this invention, the processor can evaluate whether there is sufficient funds in the preferred payment method selected by the purchaser. If there is, the processor permits the transaction to continue; otherwise, if the account does not have sufficient funds, the processor will deny the transaction and ask the purchaser to select another payment method, if any, from the common set.

According to another aspect of this invention, the purchaser is permitted to provide self-imposed purchase allowances that are stored in the purchaser database. Different purchase allowances can be imposed on different payment methods. The purchase allowances are useful for parents who wish to prevent their children from making an excessive expenditure. Upon receipt of the purchase request, the processor compares the purchase amount to the purchase allowance and denies the transaction if the allowance is exceeded, independent of the payment methods available.

According to yet another aspect of this invention, the purchasing system examines a purchaser's spending limits for some of the payment methods before consummating a transaction. Such spending limits are imposed and maintained by the institutions that administer the payment method, such as a bank or credit card company. After the purchaser selects a preferred payment method, the processor inquires to the issuing institution as to the purchaser's spending limit for that payment method. The processor then compares the purchase amount to the associated spending limit and denies the transaction if the limit is exceeded.

In one preferred implementation, an interactive television system is equipped with the purchasing system to facilitate electronic purchases. The interactive television system includes a head end server, plural set-top boxes, and a distribution network interconnecting the head end server and set-top boxes. The set-top boxes are configured to operate in a program mode where the corresponding television displays selected television programs and in a sales mode where the corresponding television displays a user interface which facilitates the purchases of goods and/or services. Each set-top box has an input mechanism (such as a keypad or a remote control device) that permits a requesting subscriber to enter a purchase request to buy goods and/or services from a designated merchant. The purchase request is sent to the head end server where the purchaser and merchant databases are located. As above, a common set of available payment methods are derived and provided to the subscriber on his/her television for selection. The subscriber uses the input mechanism for the set-top box to choose the desired payment method.

In addition to an interactive television system, the electronic purchase mediating system of this invention can be used with other interactive networks, including wide area networks, telephone networks, satellite networks, on-line networks, and Internet.

According to other aspects of this invention, a method for facilitating an electronic purchase transaction of goods and/or services is also described.

DETAILED DESCRIPTION OF THE PREFERRED EMBODIMENT

Figure 1:
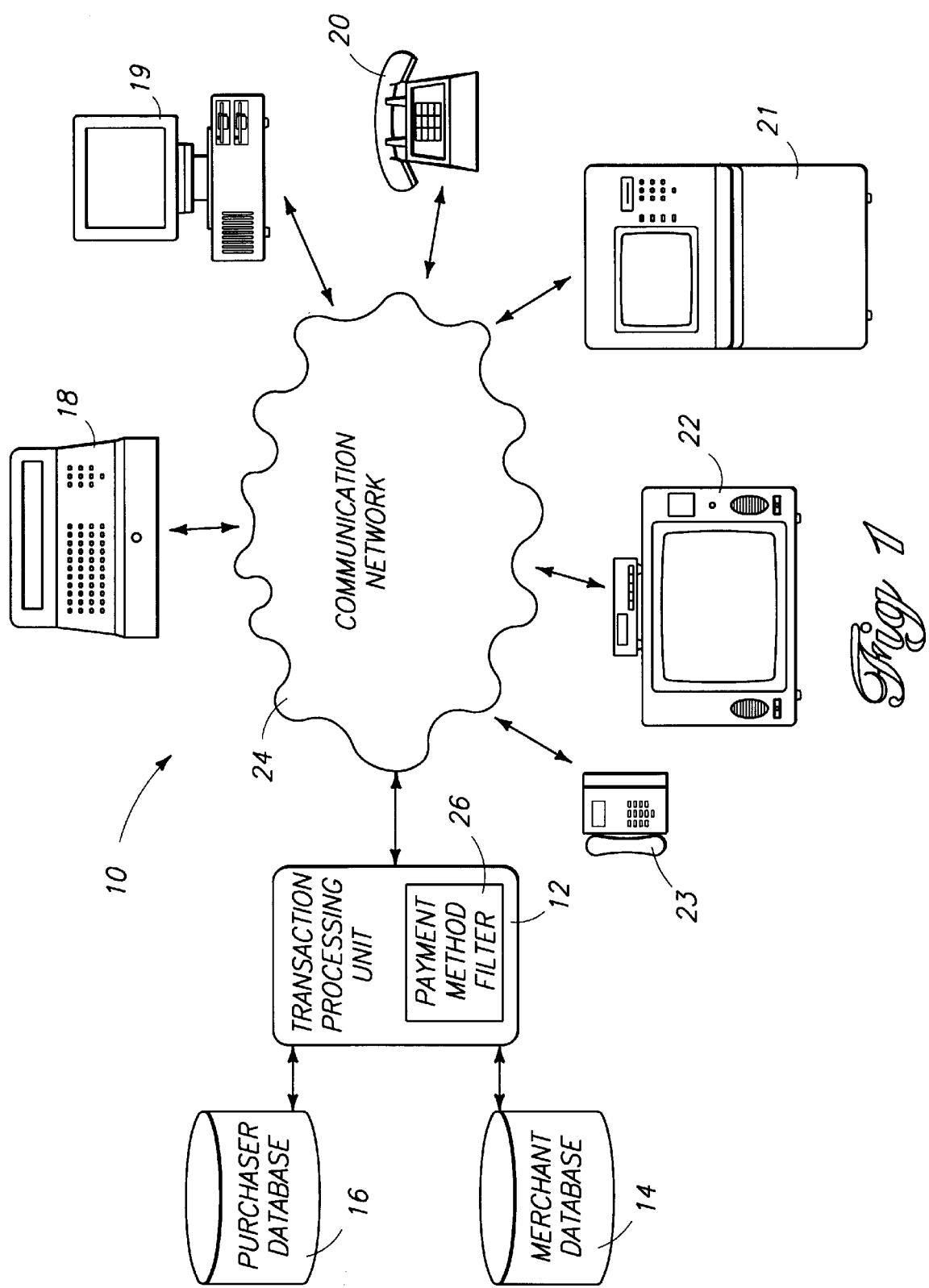
FIG. 1 is a diagrammatic illustration of a computerized purchasing system according to this invention that can be used in conjunction with various types of interactive networks and remote terminals.

FIG. 1 shows a computerized purchasing system 10 for facilitating electronic purchase transactions over an interactive network. Purchasing system 10 includes a centrally located transaction processing unit 12, a merchant database 14 and a purchaser database 16, which are both provided at the transaction processing unit. The merchant database 14 maintains a list of merchants and financial information concerning them. The financial information includes a set of the merchant's accepted payment methods, whereby the merchant is willing to accept any one of its accepted payment methods for the sale of its goods and/or services. For each of the accepted payment methods, the merchant database further contains the merchant's identification number and account information.

The purchaser database 16 maintains a list of purchasers and their associated personal financial information. The purchaser database stores a set of personal payment methods (such as checking, credit cards, debit cards, Automated Clearing House (ACH) Transfer, etc.) which are registered by the purchaser with the transaction processing unit. A purchaser can use any one of the registered personal payment methods in his/her corresponding set to purchase the goods and/or services from a merchant.

As part of this registration, the purchaser is permitted to self-impose personal purchase allowances to prevent excessive expenditure. These purchase allowances can be associated with different personal payment methods to selectively control expenditures for specific payment methods. For example, the purchaser may wish to restrict purchases using the credit card below one allowance level, while placing a different allowance level on purchases using the debit card. Alternatively, the purchase allowances might be imposed on a purchaser basis, whereby each purchaser is given an allowance regardless of the chosen form of payment. In the family setting, the purchaser could be defined as an entire family whereby every member must abide by the same purchase allowance. This enables the parents to prevent excessive expenditures that a child might accidentally attempt to make. To extend this concept farther, the system can also be configured to support a different purchase allowance for each family member, where the parents have higher allowances than the children. Individualized purchase allowances requires registration of each family member (or purchaser) so that the system can uniquely identify each person.

Purchaser database 16 also stores account balances for each of the personal payment methods of each purchaser. These account balances are used by the transaction processing unit 12 to verify that the purchaser has sufficient funds to purchase a desired product. Similarly, transaction processing unit 12 examines an associated spending limit for each personal payment method. Spending limits are imposed and maintained by the institutions that administers the payment method, such as an issuing bank or credit card company, to prevent excessive expenditure. For example, most credit cards are issued by the sponsoring bank or association with an upper spending limit.

Purchasing system 10 also has multiple purchasing terminals 18–23 located remotely from transaction processing unit 12. Purchasing terminals 18–23 are illustrated as many different types of electronic devices, including a point-of-purchase register 18, a personal computer 19, a telephone 20, a stand-alone machine 21 (e.g., an ATM), a television and set-top box unit 22, and a magnetic-stripe credit card reader 23 (e.g., a Verifone® reader). Each purchasing terminal has an input device which can receive a purchase request from a purchaser to buy goods and/or services from a merchant. The input device can be in the form of a keypad (as in the case of the register 18, telephone 20, stand-alone machine 21, and card reader 23) or a keyboard or mouse (as in the case of computer 19), or a remote control device (as in the case of a remote for the TV and set-top box unit 22). These illustrated purchase terminals are only a representative sample, as many other electronic devices can be used to make purchases in the computerized purchasing system of this invention.

An interactive communication network 24 provides the interfacing between the remotely located purchasing terminals 18–23 and the centrally located transaction processing unit 12. The interactive communication network can be in many different forms which are suitable to couple the various types of purchasing terminals to the transaction processing unit. For example, the interactive communication network can be configured as a wide area network, a telephone network, a satellite network, an on-line network, or the Internet network. Another example is an interactive television network, which is described below in more detail as one preferred implementation.

To make a purchase using the computerized purchasing system 10, a purchaser initiates a purchase request at one of the purchasing terminals 18–23. In its simplest form, the purchase request includes the identity of the merchant, the identity of the purchaser, and a purchase amount. The purchase request is sent from a purchasing terminal, over the communication network 24, to transaction processing unit 12. Upon receipt, transaction processing unit 12 does a preliminary evaluation to determine whether the purchase amount exceeds the personal purchase allowance associated with the identified purchaser. If it does, the purchase transaction is denied to prevent the excessive expenditure and the purchaser is informed that the purchase amount is more than the purchase allowance. On the other hand, if the purchase allowance is not exceeded, the transaction processing unit begins gathering information related to the purchaser and merchant involved in the transaction.

The transaction processing unit 12 accesses the merchant database 14 according to the merchant identified in the purchase request to retrieve the set of accepted payment methods which corresponds to that merchant. The processing unit 12 also accesses the purchaser database 16 according to the purchaser identified in the purchase request to retrieve the set of personal payment methods which corresponds to that purchaser.

A payment method filter 26, shown resident at transaction processing unit 12, is operable to receive the set of merchant accepted payment methods and the set of personal payment methods. The payment method filter computes an intersection of these two sets to derive a common set containing any available payment methods that is both accepted by the merchant and can be used by the purchaser to purchase the goods and/or services. Preferably, the payment method filter is implemented as a software program running on the transaction processing unit 12, or as a software program running on certain ones of the purchasing terminals 18–23 (e.g., the stand-alone machine, PC computer, or set-top box), or as complementary software running at both the transaction processing unit and one or more purchasing terminals.

The software-controlled processor is a trusted third party which is trusted by, and independent of, both the merchant and purchaser. The payment method filter 26 therefore acts as a trusted electronic mediator between the merchant and purchaser to derive common forms of acceptable payments, without revealing confidential account information to either one.

Figure 2:
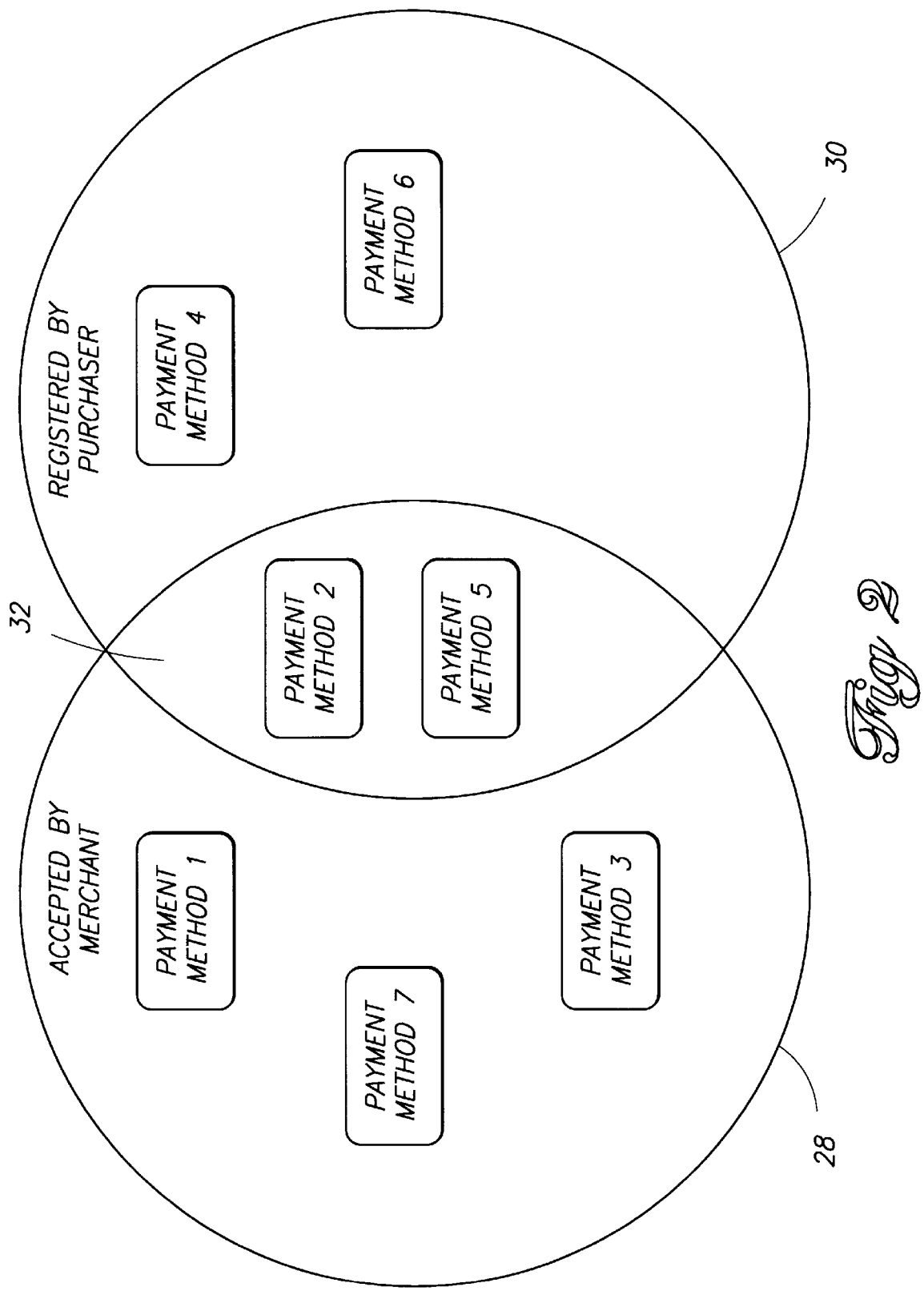
FIG. 2 conceptually illustrates the computational task of deriving an intersection between two sets that is performed by the purchase mediating system of this invention.

FIG. 2 illustrates the underlying intersection computation performed by payment method filter 26. FIG. 2 shows a first or merchant set 28 of payment methods that are accepted by the merchant. Included in set 28 are payment methods 1, 2, 3, 5, and 7, with examples being a merchant-issued charge card, cash on account, Discover®, VISA®, and MasterCard®. A second or purchaser set 30 contains four personal payment methods that are registered by the purchaser with the purchasing system. Payment methods 2, 4, 5, and 6 are included in this set 30, with examples being cash, personal check, VISA®, and American Express®. The intersection of these two sets 28 and 30 is represented by the overlapping area of the Venn circles. This intersection defines a common set 32 having mutually agreeable payment methods 2 and 5 (e.g., cash and VISA®). The payment methods within common set 32 are both accepted by the merchant and part of the purchaser's personal options for payment.

In the event that common set 32 contains more than one available payment method, which is the case in FIG. 2, the various payment methods are presented to the purchaser at the purchasing terminal for his/her selection. Preferably, the payment options are presented in a prearranged sequence according to the purchaser's preferred order of use, such as cash first, followed by VISA®. Alternatively, if the purchaser has not noted a preferential order, the payment options can be presented according to the merchant's preferred order of use or the network operator's preference. The purchaser selects a preferred option using the input device of the purchasing terminal. In those situations where the payment method filter 26 returns a null or empty common set, the transaction processing unit 12 denies the transaction for failure to find a mutually agreeable payment form.

The trusted processing unit and payment method filter derive a common set 32 of available payment methods without revealing the purchaser's "wallet" to the merchant. The different forms of payment that a purchaser can use, and their associated account numbers, are not released to the merchant. The merchant simply knows that an acceptable payment method has been agreed to by the purchaser.

Once a common set of available purchase methods has been found and the purchaser has selected a preferred option, the transaction processing unit 12 evaluates whether the purchase amount contained in the purchase request exceeds an account balance of the selected payment method. For instance, if the purchaser selects payment method 2 (e.g., cash) from common set 32, the transaction processing unit examines whether the purchaser's cash reserves will cover the purchase amount of the product. If the purchase amount exceeds the cash account balance, the purchasing terminal presents another available payment method, if any, for a new selection. If it turns out that the purchaser does not have sufficient funds in any acceptable payment method from common set 32, the transaction is terminated for lack of sufficient funds. This procedure assures the merchant that the purchaser can pay for the goods and/or services.

Additionally, the transaction processing unit 12 determines whether the purchase amount exceeds a spending limit of the selected payment method. For example, if the purchaser selects payment method 5 (e.g., VISA®), the processing unit checks whether the spending cap imposed by the issuing bank for the VISA® account is exceeded as a result of the purchase. If either the account balance or spending limit is exceeded, the transaction processing unit denies the request and informs the purchaser via the purchasing terminal.

If the purchase request satisfies the tests of the transaction processing unit, the purchaser is given one last opportunity to confirm or cancel the purchase transaction. If the purchaser confirms the purchase transaction, the processing unit attaches an unforgeable digital signature on behalf of the purchaser to authorize the purchase and to validate for the merchant that a sale has been consummated. The digital signatures are produced using signing tools, such as cryptographic signing keys, which are unique to corresponding purchasers and are stored in the purchaser database. A password entered by the purchaser authorizes the processing unit to use his/her associated signing tool kept in the purchaser database. This digital signature assures the merchant that a legally enforceable purchase transaction has occurred.

In some cases, the purchasing system might require an initial procedure to authenticate the purchaser (or merchant). For instance, the purchasing system might ask the user to input a personal identification number (PIN) before commencing the purchase transaction to verify the purchaser's authenticity. Another technique is to employ secure access hardware, such as smart card and reader, at the purchasing terminal. The smart card can be programmed with information about the user that is used to gain access to the purchasing system, such as the user's PIN or signature tools (e.g., a signing pair of encryption keys). Once the smart card is inserted into the terminal, the purchasing system performs the cardholder authentication automatically.

Figure 3:
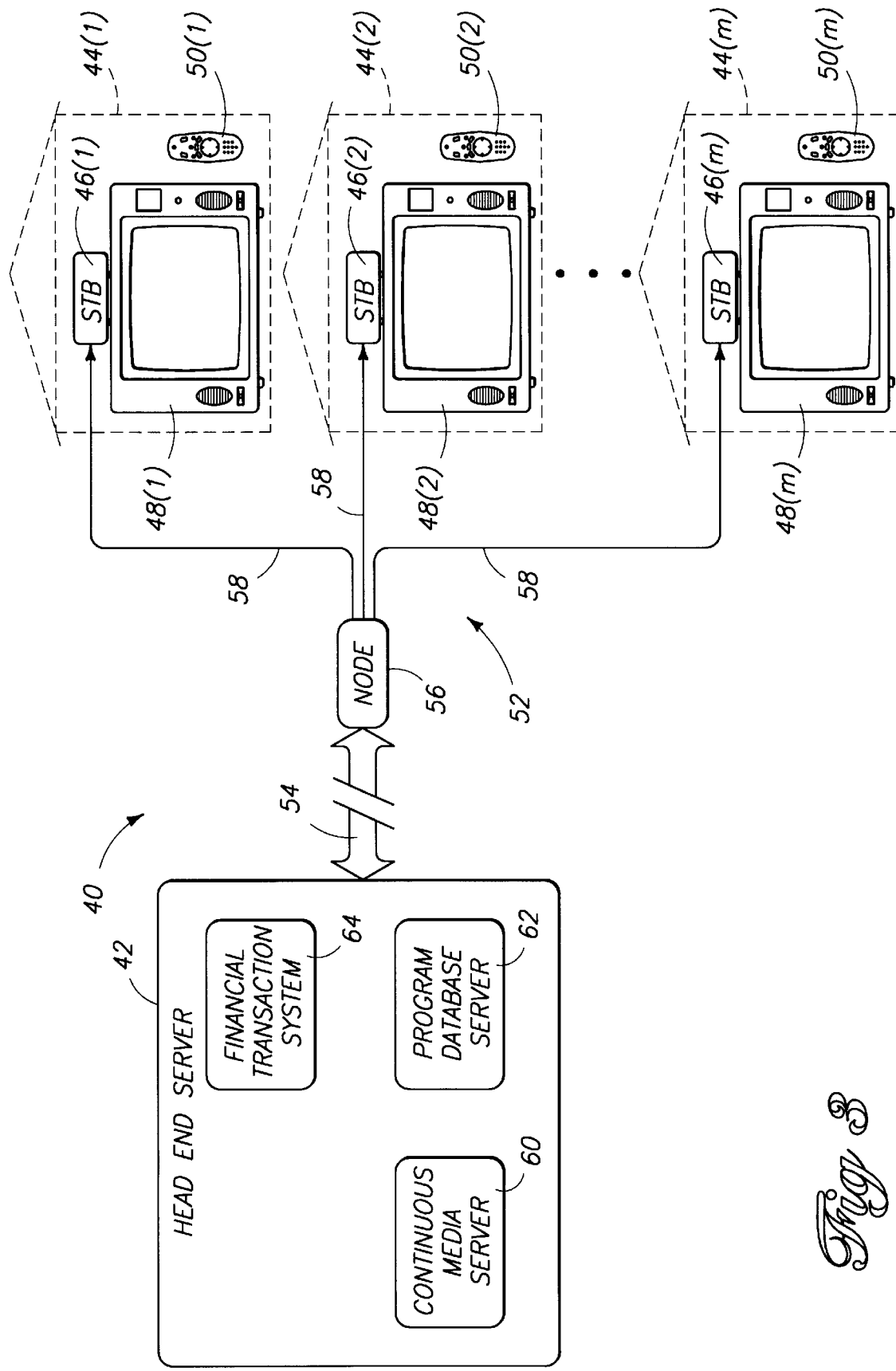
FIG. 3 is a diagrammatic illustration of an interactive television system for facilitating electronic purchases of goods and/or services according to one preferred implementation of this invention.

FIG. 3 shows an interactive television system 40 for facilitating electronic purchases of goods and/or services according to one preferred implementation of this invention. Interactive television system 40 includes a centralized head end server 42 which is configured to provide both television programming services and financial transaction services to multiple homes, of which representative homes 44(1)–44(m) are shown. A single head end server 42 might be designed, for example, to service 250,000 homes. Each home 44(1)–44(m) is depicted for explanation purposes as having at least one set-top box (STB) 46(1)–46(m) coupled to at least one television 48(1)–48(m), and a remote control handset 50(1)–50(m). The set-top boxes are connected to receive signals from head end server 42. As is customary, the set-top boxes control which programs are displayed on their associated televisions.

Head end server 42 is interconnected to the end viewers' homes 44(1)–44(m) via a multi-tier distribution structure 52. Distribution structure 52 includes a high speed, high bandwidth fiber optic cable network 54 coupled to many regional distribution nodes (represented by distribution node 56). The speed and bandwidth of fiber optic cable affords the desired performance for supporting a fully interactive television system. Each distribution node 56 is connected to multiple STBs 46(1)–46(m) via conventional home entry lines 58, such as twisted-pair lines, coaxial cable, or fiber. As an example, each distribution node 56 supports approximately 500–1200 homes. As technology continues to improve, it is believed that parts of the distribution structure can be replaced with wireless forms of communication, such as RF communication or satellite communication.

Head end server 42 transmits traditional broadcast and cable programming over multiple channels to each home, much like the familiar conventional cable television systems. The programs are embodied as digital video data streams that are transmitted from head end server 42 over distribution structure 52 to homes 44(1)–44(m). The head end server receives the video signals from another source, such as a broadcast signal, a satellite feed, or other cable system.

Head end server 42 also provides additional services, such as movie-on-demand and an electronic programming guide. In FIG. 3, head end server 42 is shown as having a continuous media server 60 and a program database server 62. Continuous media server 60 stores the digital video data streams for selected movies that are to be provided on demand to an individual household. The continuous media server is preferably implemented as a disk array data storage system consisting of many large capacity storage disks, each on the order of one to several Gigabytes. The video data streams of the movies are stored digitally on the storage disks in predetermined or mapped locations. The locations of the video data streams are kept in a memory map and each video data stream can be accessed through pointers to the particular memory location.

The continuous media server can service simultaneous requests to view a movie on demand (even the same movie) from thousands of homes. The digitally stored video data streams can be accessed by any number of viewers at the same or staggered times. For example, one household might request a video data stream at 8:00 pm, and a second household might request the same video data stream at 8:02 pm. This situation is easily accommodated by slightly staggered pointers to the same video data stream beginning at the same memory location.

Database server 62 stores program descriptive information used by the electronic programming guide (EPG) or other menus, such as a movie-on-demand menu. The database server stores such data as the program title, actor information, whether the program has closed caption or stereo, the scheduled viewing time, the network name, the program category, and a description text. The program information is used to update the EPG or other menu as the user scrolls through them.

Database server 62 also holds pointers to memory locations within the continuous media server 60. The pointers identify the storage locations of the video data streams of the movies. According to this interactive television system 40, the viewer simply selects the movie of his/her choice from a menu on the screen and the head end server retrieves the digital video data stream from the continuous media server 60 using the pointers from database server 62 and transmits the digital video data stream to the requesting set-top box for display on the associated television.

Interactive television system 40 also includes a financial transaction system 64 which facilitates the purchase of goods and/or services between an ITV subscriber and a merchant. The financial transaction system 64 resides primarily at head end server 42, although portions of the system are provided at the STBs 46(1)–46(m).

Figure 4:
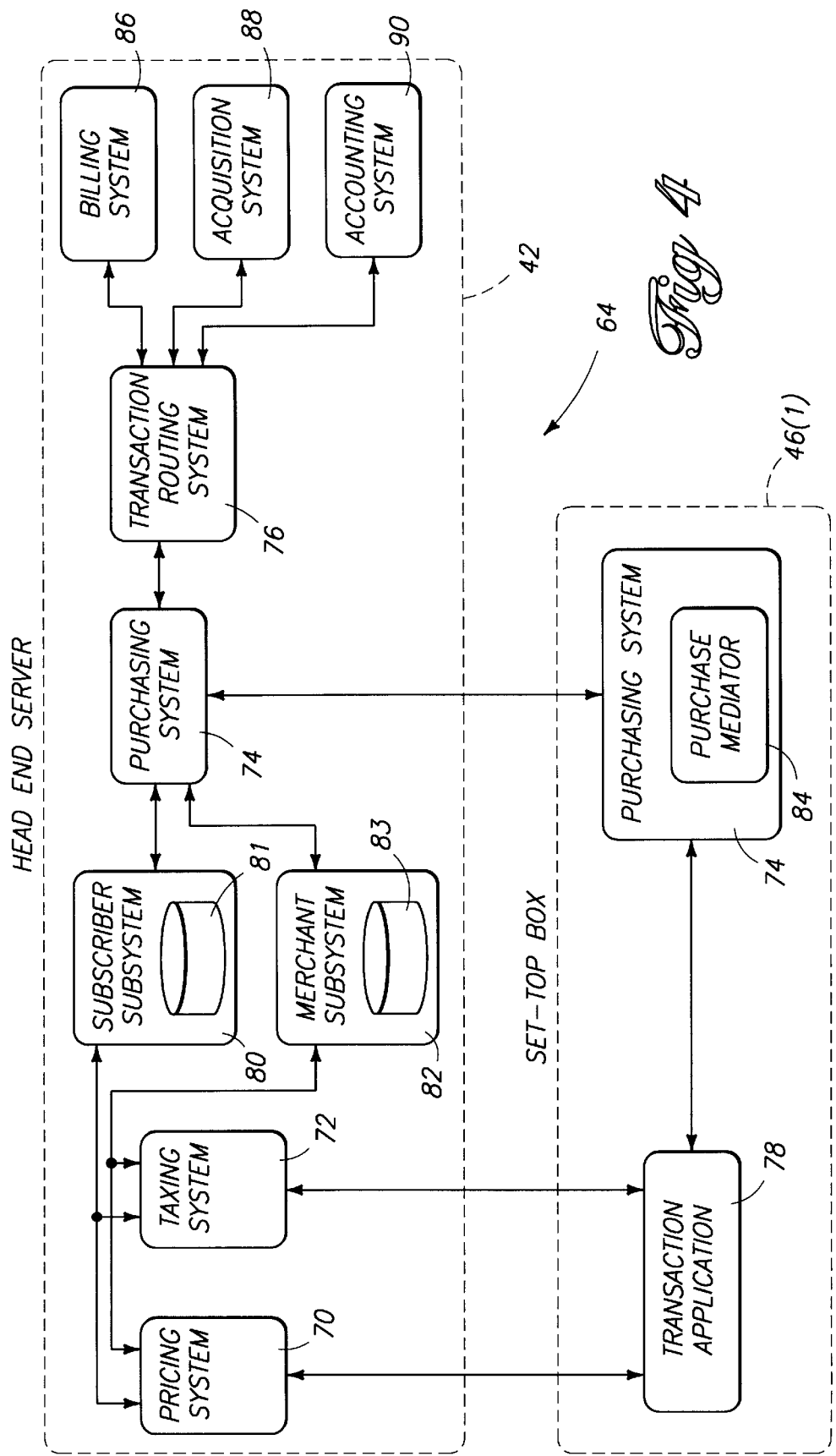
FIG. 4 is a block diagram of a purchase mediating system used in the interactive television system of FIG. 3.

FIG. 4 shows a more detailed block diagram of the financial transaction system 64. It has a pricing system 70, a taxing system 72, a purchasing system 74, and a transaction routing system 76. Pricing system 70 is configured to receive an unpriced purchase transaction from a transaction application 78 at set-top box 46(1) and establish pricing and discounting information. From the perspective of the transaction application 78, pricing system 70 operates like a lookup table whereby for a given product, a price and discount information are returned. However, the pricing system is rather complex in that it provides pricing and discounting information in a quick time frame, because the subscriber is given an opportunity to confirm or deny the purchase in real-time and needs to review the applicable and exact pricing information. The pricing system might also use information in the subscriber database for features such as coupons or frequent buyer programs.

The taxing system 72 determines an appropriate tax for the sales transaction. Because different subscribers to the interactive televisions system live in different regions of the country, the taxing system first determines the tax areas which have jurisdiction over the subscriber. Such tax areas include city, county, state, national, and special governments like a regional transit authority. Oftentimes, multiple taxes apply to a single product. The taxing system also determines the product category because goods and services are treated differently in different jurisdictions.

Once a particular transaction has an appropriate price and tax, control is transferred to the purchasing system 74 which is implemented in software running on processors located at both the head end server 42 and set-top box 46(1). Purchasing system 74 is coupled to a subscriber subsystem 80 and a merchant subsystem 82. The subscriber subsystem 80 includes a database 81 containing a list of subscribers correlated with their personal account information, and namely, their associated sets of personal payment methods. The merchant subsystem 82 includes a database 83 which stores a list of merchants correlated with their associated sets of accepted payment methods, and account information for each method. These databases store similar content to those described above with reference to FIG. 1.

Purchasing system 74 has a purchase mediator 84 which mediates the purchase transaction between the merchant and subscriber. The purchase mediator consists primarily of a user interface (UI) code running on the set-top box in the subscriber's home. More particularly, the set-top box can be operated in a sales mode where the corresponding television displays the purchase mediator UI to facilitate purchases of goods and/or services from various merchants. The subscriber employs the UI and an input mechanism, such as the remote control handset, to enter a purchase request for a particular good and/or service from a designated merchant. The purchase mediator helps determine a mutually agreeable payment method that is both accepted by the designated merchant and one of the requesting subscriber's personal payment methods, and then presents these options to the subscriber.

Figure 5:
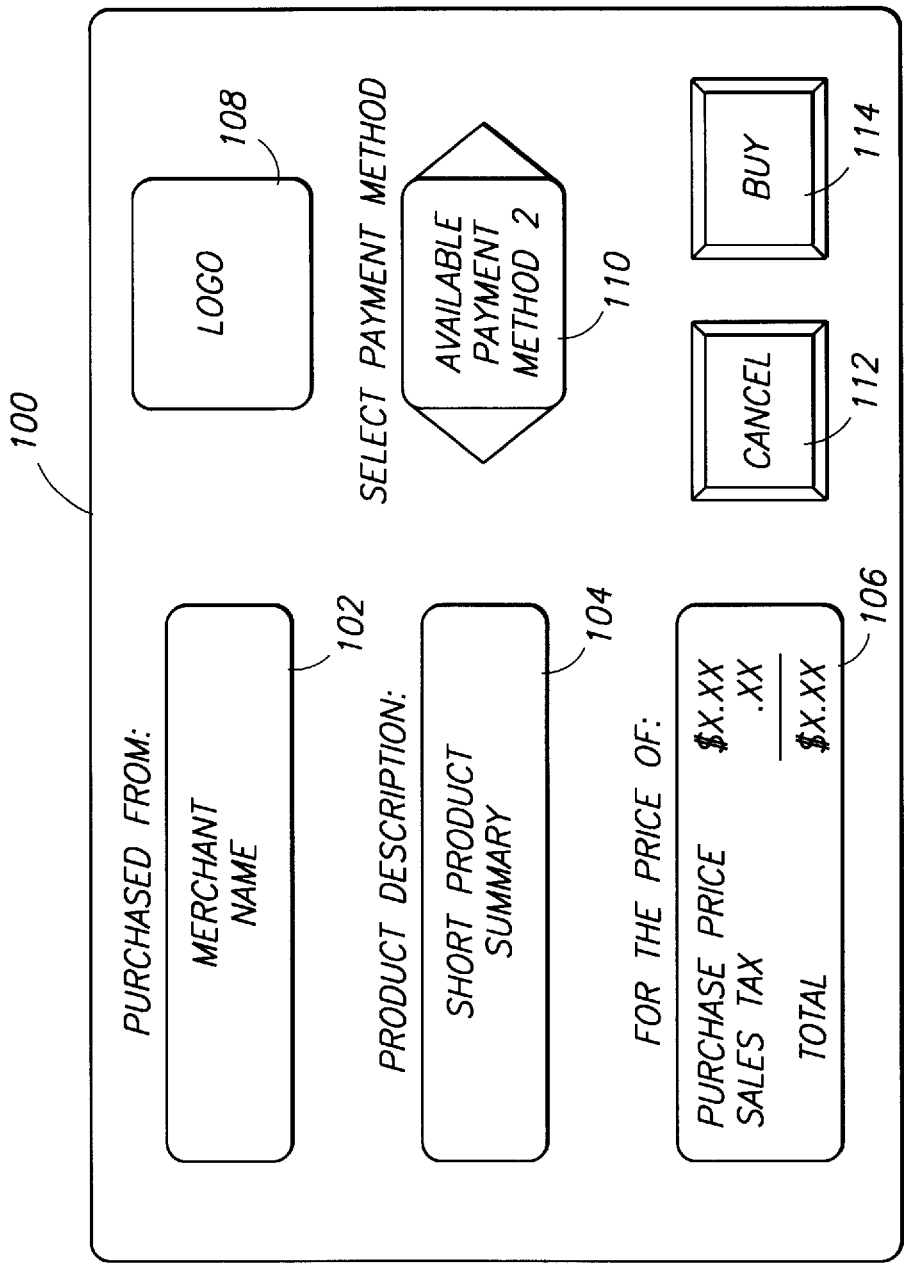
FIG. 5 is a user interface that is displayed on a television of the interactive television system during a purchase transaction.

FIG. 5 shows one example user interface 100 that the purchase mediator can have displayed on the television. UI 100 includes a text box 102 for the merchant's name, a text box 104 for a short description of the product, an alphanumeric box 106 for showing the price, tax, and purchase amount of the product, and a space 108 for a sponsoring logo. It is noted that the text boxes 102 and 104 can also be used to display logos in bit map form or other custom display, such as animation. UI 100 further includes a spin dial 110 which presents the available payment methods in a sequential order, and if desired, in a prearranged order according to the subscriber's preferences. Spin dial 110 might also include logos of the sponsoring institution, such as a logo for a bank or affinity organization (e.g., SeaFirst Bank® or United Mileage Plus First Card®) or a card association logo (e.g., Discover®). A cancel button 112 and a buy button 114 enable the subscriber to accept or deny the transaction before any money exchanges hands. A focus frame, or the like, can be manipulated in the UI to highlight the active box. FIG. 5 is but one example arrangement of information that can be presented to the subscriber, and many other arrangements with more or less information can be used.

With reference to FIGS. 4 and 5, and the flow diagram of FIGS. 6 and 7, a method for electronically transacting a purchase over an interactive television system will now be described. At step 200 (FIG. 6), a list of purchasers (i.e., the subscribers) who have registered with the head end server are stored in the subscriber database 81. At step 202, a set of personal payment methods for each purchaser is stored in the subscriber database in a correlated manner for easy indexing. Similarly, a list of merchants and their corresponding sets of accepted payment methods are stored in the merchant database 83 (steps 204 and 206 in FIG. 6). The initial steps 200 to 206 of establishing subscriber and merchant databases need not be sequentially performed (as shown for purposes of illustration), but are more likely to occur concurrently. The subscriber database and merchant database are formed over time as new viewers subscribe to the system and more merchants participate.

The subscriber manipulates a focus frame in UI 100 using an input device, such as the remote control handset, to select a certain product for purchase from a designated merchant. Upon the subscriber's instructions, the purchase mediator 84 on set-top box 46(1) generates a purchase request to buy the product (step 208 in FIG. 6). At step 210, the pricing system 70 and taxing system 72 are invoked to assign the appropriate price and tax to the product, thereby yielding an overall purchase amount. The price, tax, and total purchase amount are displayed in alphanumeric box 106 of UI 100. It is noted that in an alternative implementation, the purchase mediator might provide the price and tax on its own without reference to the pricing system 70 and taxing system 72. A resultant purchase request therefore contains at least an identity of the requesting subscriber and designated merchant, and the purchase amount.

Figure 6:
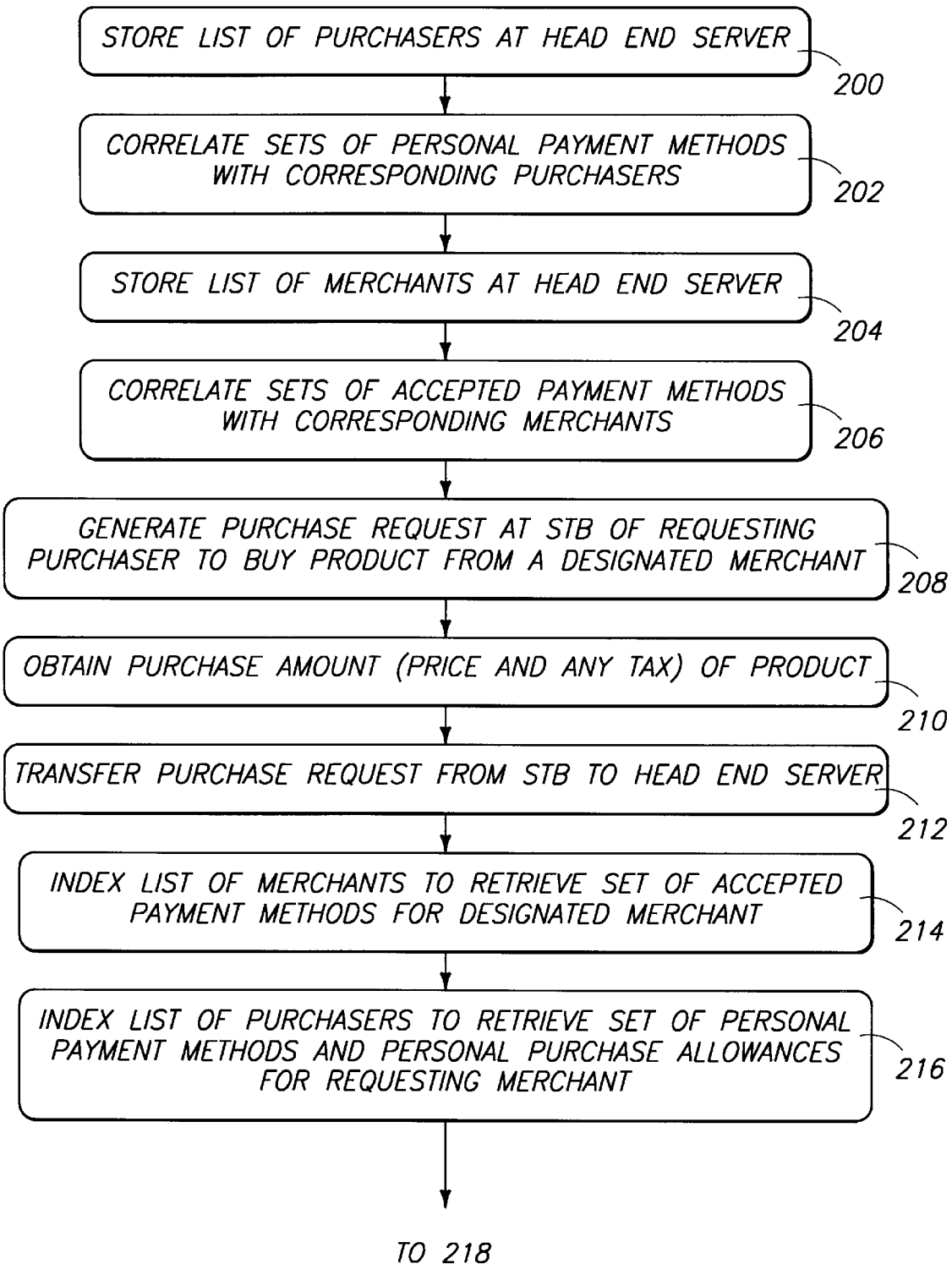
FIGS. 6 and 7 are a flow diagram of a method for facilitating an electronic purchase transaction of goods and/or services using the interactive television system.

At step 212 in FIG. 6, purchasing system 74 transfers the purchase request over the distribution network from set-top box 46(1) to head end server 42 (FIG. 4). The head end server portion of purchasing system 74 indexes the list of merchants kept in merchant database 83 to retrieve the set of accepted payment methods and account information that corresponds to the merchant identified in the purchase request (step 214). The list of subscribers in subscriber database 81 is also indexed to retrieve the set of personal payment methods, spending limits, self-imposed purchase allowances, account balances, and any other financial information that corresponds to the subscriber identified in the purchase request (step 216). It is noted that the ability to index these databases and pull up real registered parties helps ensure that the transaction involves registered, legitimate, identifiable parties, and is not a fraudulent transaction.

Figure 7:
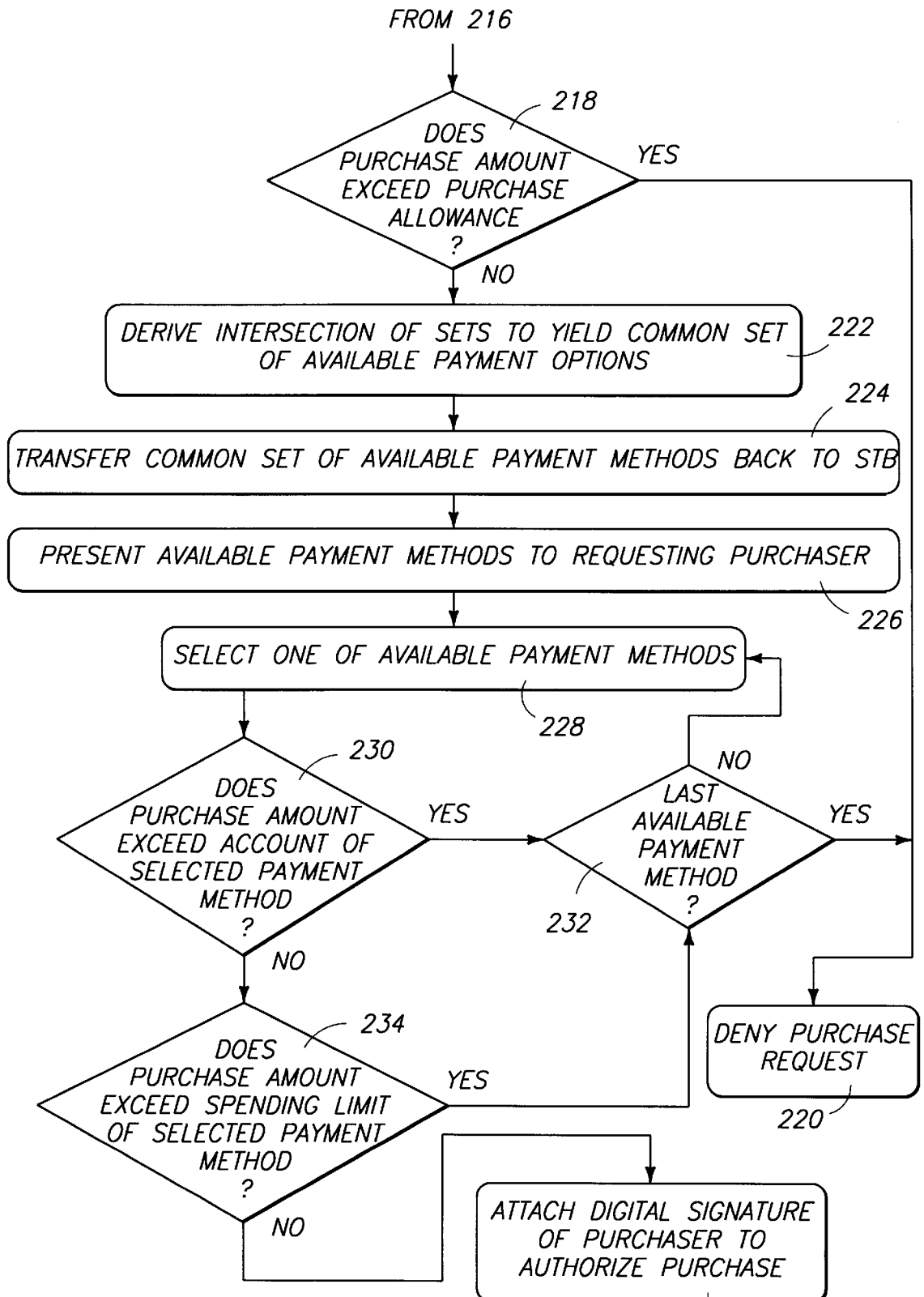

At this point, the purchasing system 74 examines whether the purchase amount exceeds a purchase allowance that has been imposed by the subscriber (step 218 in FIG. 7). If it does (i.e., the "yes" branch from step 218), the purchasing system denies the request and informs the subscriber that the purchase amount exceeds the purchase allowance (step 220). Conversely, if the purchase allowance is not exceeded (i.e., the "no" branch from step 218), the purchasing system derives an intersection of the set of personal payment methods and the set of accepted payment methods to yield a common set that comprises any available payment methods that are both accepted by the merchant and can be used by the purchaser for purchase of the goods and/or services (step 222).

The intersection derivation can be computed at one of two locations: at the head end server or at the set-top box. If the intersection computation is performed at the head end server 42, the common set is transferred back to set-top box 46(1) (step 224 in FIG. 7). Otherwise, if performed at set-top box 46(1), the full two sets of information are sent to set-top box where the purchasing system then performs the intersection. It is more preferred to have the computation performed at head end server 42 because less data is transferred between the head end server and set-top box.

At step 226, the available payment methods contained in the common set are presented to the subscriber using UI 100. More particularly, the available payment methods are arranged in sequential order, according to the subscriber's preference, and presented as a spin dial 110 in UI 100. The subscriber selects the default payment method, or cycles through any alternative choices, to inform the purchasing system of a desired payment method. In this manner, the subscriber has control of his/her own wallet, and the system is not biased toward any particular option. It is noted that if there are no available payment method, the purchasing system denies the transaction and informs the user via UI 100 that no mutually agreeable payment method exists.

The subscriber selects a desired payment method using the remote control handset for the set-top box (step 228).

The purchasing system evaluates the purchase request in view of the selected payment method. An initial test determines whether the purchase amount exceeds an account balance of the selected payment method (step 230). For instance, suppose the selected payment method is cash, and the subscriber has $1,200 in this account. Further, suppose the purchase amount is $2,100. In this case, the purchase amount exceeds the subscriber's account balance (i.e., the "yes" branch from step 230) and the purchasing system denies the transaction as to that payment method. The system then quickly checks to see if there are any other mutually agreeable payment methods (step 232). If another available payment method exists (i.e., the "no" branch from step 232), the subscriber is asked to pick a new payment option. On the other hand, if no more options exist (i.e., the "yes" branch from step 232), the purchase request is denied (step 220). This procedure verifies for the merchant that the subscriber chooses a payment method that contains sufficient funds or credit to pay for the goods, and thereby protects the merchant from selling a product to a subscriber who might not be able to afford the product.

At step 234, the purchasing system further evaluates whether the purchase amount exceeds any spending limit associated with the selected payment method by checking with the appropriate sponsoring institution. For this example, suppose the selected payment method is a credit card having a credit limit of $5,000, and the purchase amount is $8,000. Here, the purchasing system will learn upon checking with the card's issuing bank that the purchase amount exceeds the credit card spending limit imposed by the issuing bank, and thus the transaction should be denied for that payment method. As above, the subscriber is given an opportunity to select another payment method, if any are available, via steps 232 and 228.

If the purchase request survives these various tests, the subscriber is presented with one final opportunity to cancel the purchase. With reference to UI 100 in FIG. 5, the subscriber uses buttons 112 and 114 to respectively cancel or confirm the purchase transaction. If the subscriber confirms, the purchasing system attaches a digital signature of the purchaser to authorize the purchase (step 236 in FIG. 7). This assures the merchant that the purchaser is real, has sufficient money, will pay for the goods, and has legally signed for the goods.

The above evaluation steps for a selected payment method can be made in alternative sequences. For instance, the purchasing system might attach the digital signature (step 236) following selection of a payment method. The system then subsequently permits completion of the purchase if the tests set forth in steps 230 and 234 are successful. Furthermore, the order of the tests provided in steps 230 and 234 can be reversed. As still another variation, the purchase allowance test of step 218 might be performed after the payment method is selected in the event that the purchaser has imposed different purchase allowances for individual payment methods.

With reference again to FIG. 4, the consummated purchase transaction is forwarded from purchase mediator 84 to transaction routing system 76 which logs the transactions in a general ledger and routes the transactions to the appropriate system for approval and posting to the subscriber's account. More particularly, the transaction routing system 76 journals each transaction for audit purposes and logs each transaction against an appropriate account in the general ledger. The transaction routing system selects a subscriber account, selects a merchant account, authorizes a withdrawal from the subscriber account, and authorizes a corresponding deposit in the merchant account. Appropriate credit and debit entries are made in the general ledger.

The transaction routing system is coupled to a billing system 86, an acquisition system 88, and an accounting system 90. These are example systems that handle the mechanics of submitting a bill to the subscriber and posting the appropriate transaction in the acquiring account (such as a credit card account) and/or subscriber account.

During the purchase transaction, the purchasing system of this invention assumes that a secure communication path exists between its software components on the centrally located head end server and its software components on the remotely located STB. To ensure that a secure communication path exists, the purchasing system employs cryptography techniques to authenticate the communicating software components. Digital certificates are assigned to each STB in the system and to the head end server. A digital certificate is a packet of unique information in digital data form that is used for identification of a party in the encryption arena. The certificate is issued by an independent and trusted third party, known as the "certifying authority". Every participant trusts the certifying authority. An example certifying authority in this situation is the cable network operator of the interactive television system.

Each assigned certificate contains an expiration date, the holder's serial number, a public data exchange encryption key unique to the holder, a public signing key unique to the holder, and a signature from the certifying authority. Before continuing discussion on how to secure a communication path between the head end server and an STB, it would be beneficial to briefly discuss encryption techniques, and how digital certificates are used. There are different encryption techniques available and in use today. This invention can be used with any type of encryption technique. For the sake of explanation, the basics of one common encryption technique known as "RSA" (an acronym based on the initials of the creators of the encryption algorithm) are described below.

RSA encryption makes use of special mathematical functions referred to as "one-way" functions. According to one-way functions, one or more starting parameters can undergo a function to yield an intelligible result, but the inverse function operating on this result will not produce the starting parameters. In mathematical terms, a one-way function F is represented as follows:

$$F(a)=b, \text{ but } F^{-1}(b) \neq a.$$

Such functions are used to produce private and public cryptographic keys which are assigned to every party that wishes to participate in encrypting and decrypting messages. The key set is unique and has the property that if one knows the public key $K_{public}$, one cannot guess the private key $K_{private}$. The public key $K_{public}$ is published for everyone to use, while the private key $K_{private}$ is kept secret by the holder.

For a message M that is encrypted via an encryption function E and decrypted via a decryption function D using one of the public or private keys $K_{public}$ or $K_{private}$, the following holds:

$$E_{Kpublic}(M)=M_{encrypted-1}$$

$$D_{Kprivate}(M_{encrypted-1})=M$$

but, $$D_{Kpublic}(M_{encrypted-1}) \neq M$$

Additionally, $$E_{Kprivate}(M) = M_{encrypted-2}$$

$$D_{Kpublic}(M_{enctypted-2}) = M$$

but, $$D_{Kprivate}(M_{encrypted-2}) \neq M$$

Accordingly, in the context of our interactive television system, if the set-top box encrypts a message using the head end server's public key, only the head end server can decrypt it. Furthermore, if the set-top box encrypts a message using its private key (which only the STB can do since no one else has access to this private key), any other party can decrypt the text using the STB's public key which is widely known.

To establish communication for the purchase transaction, the requesting STB and head end server initially exchange their respective digital certificates. The STB then sends a message to the head end server using the head end server's public key of the data exchange key pair that it received in the head end server's certificate. Only the head end server can decrypt that message by using its own private key of the data exchange key pair. In a similar fashion, the head end server can encrypt a reply message using the STB's public data exchange key and only the requesting STB can decrypt that message.

This raises a new issue. When the STB or head end server receives an encrypted message that is supposedly from the other, how does the receiving party really know if it came from the other? Or in the context of a purchase transaction, how does the head end server really know that the purchase request came from a legitimate subscriber or legitimate STB?

To solve this dilemma, encryption algorithms introduce "digital signatures" which ensure that the appropriate parties are communicating with each other. A digital signature is computed by hashing the data contained in the message sent between the STB and head end server. A hash function is a mathematical function that converts an input data stream into a fixed-size, often smaller, output data stream that is representative of the input data stream. Suppose that the STB wishes to encrypt and sign a message destined for the head end server. The STB computes a hash of the message and then uses its private signing key to encrypt the resultant digest, as follows:

$$E_{K-stb-private-sign}(HM) = HM'$$

where the "E" denotes an encryption function on the hash of the message "HM" and the subscript "$K_{stb-private-sign}$" means the STB's private key of the signing key pair was employed to perform the encryption. The head end server will be able to verify the STB's digital signature by decrypting the hash using the STB's public signing key, independently computing the hash of the original message, and comparing the locally computed hash with the decrypted hash. The comparison will succeed only if the STB's private signing key was used to encrypt the hash. Since only the STB knows the private signing key, the head end server can be assured that the STB actually created the encrypted hash, essentially "signing" the message.

Note that any party can intercept the communication between the STB and head end server and use the STB's public key to determine that the communication came from the STB. However, that intercepting party cannot decipher the encrypted message because they do not know the head end server's private key.

This encryption scheme therefore ensures for the receiving party (i.e., the head end server in this example) that the communication is from the desired sending party (i.e., the STB) and that only the receiving party can read the original message.

The encryption scheme only works, however, if the head end server and STB trust each other's identity. Accordingly, the "certifying authority" is introduced as a trusted third party to the communication. The head end server and STB each prove their identity to the satisfaction of the certifying authority and deposit their public keys with this authority. In turn, the certifying authority issues a digital certificate that contains an expiration date, the holder's serial number, a public data encryption key unique to the holder, a private signing key, and any other information appropriate to establish communication. The identification information is encrypted using the certifying authority's private key, as follows:

Certificate=$E_{K-CA-private}$ (Expiration, Card Serial #, $K_{STB-public}$, etc.)

During the initial communication, the STB and head end server exchange their certificates. Both the STB and head end server decipher the other's certificate using the certifying authority's public key. The STB and head end server can each be assured that it is talking to the other legitimate party if the certificate deciphers into intelligible information. It is practically impossible for either the head end server or STB to construct a fraudulent certificate because neither knows the private key of the certifying authority. In this manner, a secure path is established between the STB and head end server to facilitate the purchase transaction described above.

The computerized purchasing system of this invention provides many benefits. One benefit is that it automatically determines a set of mutually agreeable payment methods without revealing any confidential account information to either the purchaser or merchant. Another benefit is that it aids in preventing fraudulent transactions, both on the part of the merchant and the purchaser, by automatically mediating the purchase and ensuring that the subscriber and merchant actually exist. Another benefit is that it provides confidence to the merchant that the purchaser has sufficient funds to purchase the goods. Still another benefit is that it prevents the purchaser from over spending beyond personal purchase allowances and spending limits imposed on the payment methods.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An electronic purchase mediating system comprising:
   a purchaser database having a list of purchasers, the purchaser database also storing a set of many personal payment methods for corresponding ones of the purchasers whereby an individual purchaser could use any one of the personal payment methods in that purchaser's corresponding set to purchase goods and/or services;
   a merchant database with a list of merchants, the merchant database also storing a set of many accepted payment methods for corresponding ones of the merchants whereby an individual merchant is willing to accept any one of the accepted payment methods in that merchant's corresponding set for sale of the goods and/or services;

a processor coupled to the purchaser and merchant databases, the processor also being coupled to receive a purchase request for goods and/or services, the purchase request identifying a merchant and a purchaser;

the processor accessing the merchant database according to the merchant identified in the purchase request to retrieve the set of many accepted payment methods which corresponds to that merchant, the processor also accessing the purchaser database according to the purchaser identified in the purchase request to retrieve a set of many personal payment methods which corresponds to that purchaser; and the processor computing an intersection of these two sets to derive a common set of any available payment method that is both accepted by the merchant and can be used by the purchaser for purchase of the goods and/or services.

2. An electronic purchase mediating system as recited in claim 1 wherein:

the purchase request further includes a purchase amount;

the purchaser database includes personal purchase allowances for associated purchasers, each personal purchase allowance being imposed by the purchaser to prevent an expenditure in excess of the personal purchase allowance; and the processor evaluates whether the purchase amount contained in the purchase request exceeds a personal purchase allowance associated with the identified purchaser.

3. An electronic purchase mediating system as recited in claim 1 wherein:

the purchase request further includes a purchase amount;

the personal payment methods of the purchasers have associated spending limits, each spending limit being imposed and maintained by an institution that administers the payment method to prevent an expenditure in excess of the spending limit; and the processor communicates with the institution to evaluate whether the purchase amount contained in the purchase request exceeds a spending limit of any available payment method in the common set.

4. An electronic purchase mediating system as recited in claim 1 wherein:

the purchase request further includes a purchase amount;

the purchaser database includes account balances for corresponding ones of the personal payment methods for related purchasers; and the processor evaluates whether the purchase amount contained in the purchase request exceeds an account balance of any available payment method in the common set.

5. An electronic purchase mediating system as recited in claim 1 wherein:

the purchaser database includes unique signing keys for creating digital signatures for corresponding ones of the purchasers; and the processor creates a digital signature on behalf of the identified purchaser to authorize the purchase of the goods and/or services.

6. A purchasing system for use on an interactive network, the purchasing system comprising:

a centrally located transaction processing unit;

a merchant database provided at the transaction processing unit, the merchant database having a list of merchants and sets of accepted payment methods for corresponding ones of the merchants, whereby an individual merchant is willing to accept any one of the accepted payment methods in that merchant's corresponding set for sale of the goods and/or services;

a purchaser database provided at the transaction processing unit, the purchaser database having a list of purchasers and sets of personal payment methods for corresponding ones of the purchasers, whereby an individual purchaser could use any one of the personal payment methods in that purchaser's corresponding set to purchase the goods and/or services;

multiple purchasing terminals located remotely from the transaction processing unit, each purchasing terminal having an input device which can receive a purchase request from a purchaser to buy goods and/or services from a merchant, the purchase request identifying the merchant and the purchaser;

an interactive communication network which interfaces the remotely located purchasing terminals with the centrally located transaction processing unit, the communication network transferring the purchase request from one of the purchasing terminals to the transaction processing unit;

the transaction processing unit accessing the merchant database according to the merchant identified in the purchase request to retrieve the set of accepted payment methods which corresponds to that merchant, and further accessing the purchaser database according to the purchaser identified in the purchase request to retrieve the set of personal payment methods which corresponds to that purchaser; and a payment method filter operable to receive the set of merchant accepted payment methods and the set of personal payment methods and to compute an intersection of these two sets to derive a common set containing any available payment methods that is both accepted by the merchant and can be used by the purchaser for purchase of the goods and/or services.

7. A purchasing system as recited in claim 6 wherein:

the payment method filter resides at the transaction processing unit; and the transaction processing unit transfers the common set back to the one purchasing terminal via the communication network to inform the purchaser of any available payment methods.

8. A purchasing system as recited in claim 6, further comprising:

multiple payment method filters provided at corresponding ones of the purchasing terminals; and the transaction processing unit transfers the set of accepted payment methods retrieved from the merchant database and the set of personal payment methods retrieved from the purchaser database back to the one purchasing terminal via the communication network whereby a payment method filter resident at the one purchasing terminal computes the common set to inform the purchaser of any available payment methods.

9. A purchasing system as recited in claim 6 wherein:

the transaction processing unit and payment method filter do not reveal to the merchant the set of personal payment methods of the purchaser.

10. A purchasing system as recited in claim 6 wherein:

the purchase request further includes a purchase amount;

the purchaser database includes account balances for corresponding ones of the personal payment methods for related purchasers;

the one purchasing terminal presents the common set of available payment methods to the purchaser for selection whereby the purchaser selects a desired payment method using the input device at the one purchasing terminal; and the transaction processing unit evaluates whether the purchase amount contained in the purchase request exceeds an account balance of the selected payment method.

11. A purchasing system as recited in claim 10 wherein:

in the event that the purchase amount exceeds the account balance of the selected method, the purchasing terminal presents to the purchaser another available payment method from the common set for selection.

12. A purchasing system as recited in claim 6 wherein:

the purchaser database includes unique signing keys for creating digital signatures of the purchasers; and the transaction processing unit creates a digital signature on behalf of the purchaser identified in the purchase request to authorize the purchase of the goods and/or services.

13. A purchasing system as recited in claim 6 further comprising:

smart cards assigned to corresponding purchasers;

smart card readers located at ones of the purchase terminals;

the smart cards storing unique signing keys for creating digital signatures for the corresponding purchasers; and the processor using a unique signing key to create a digital signature on behalf of the identified purchaser to authorize the purchase of the goods and/or services.

14. A purchasing system as recited in claim 6 wherein:

the purchase request further includes a purchase amount;

the purchaser database includes personal purchase allowances for associated purchasers, each personal purchase allowance being imposed by the purchaser to prevent an expenditure in excess of the personal purchase allowance; and the transaction processing unit evaluates whether the purchase amount contained in the purchase request exceeds a personal purchase allowance associated with the purchaser identified in the purchase request.

15. A purchasing system as recited in claim 6 wherein:

the purchase request further includes a purchase amount;

the purchaser database includes purchase allowances for corresponding ones of the personal payment methods of the purchasers, each personal purchase allowance being imposed by the purchaser to prevent an expenditure in excess of the personal purchase allowance; and the transaction processing unit evaluates whether the purchase amount contained in the purchase request exceeds a personal purchase allowance associated with a particular payment method.

16. A purchasing system as recited in claim 6 wherein:

the purchase request further includes a purchase amount;

the personal payment methods of the purchasers have corresponding spending limits, each spending limit being imposed and maintained by an institution that administers the payment method to prevent an expenditure in excess of the spending limit; and the transaction processing unit communicates with the institution to evaluate whether the purchase amount contained in the purchase request exceeds a spending limit of any available payment methods in the common set.

17. A purchasing system as recited in claim 6 wherein:

in the event that the common set derived by the payment method filter contains multiple available payment methods, the purchasing terminal presents the common set of available payment methods in a prearranged sequence according to the purchaser's preferred order of use for paying for the goods and/or services.

18. A purchasing system as recited in claim 6 wherein:

the communication network is selected from a group comprising wide area networks, interactive television networks, telephone networks, satellite networks, on-line networks, and the Internet network.

19. A purchasing system as recited in claim 6 wherein:

the purchasing terminal and the transaction processing unit have associated digital certificates, each digital certificate including a unique public key and a signature from a certifying authority; and a communication path within the communication network is secured by exchanging the digital certificates and encrypting communication using the public keys.

20. An interactive television system for facilitating electronic purchases of goods and/or services, the interactive television system comprising:

a centrally located head end server;

a plurality of set-top boxes located in subscribers homes for controlling content displayed on corresponding televisions and being operably connected to communicate with the head end server, individual set-top boxes being configured to operate in a program mode where the corresponding television displays selected television programs and in a sales mode where the corresponding television displays a user interface which facilitates purchases of goods and/or services from merchants, the individual set-top boxes having an input mechanism that permits a requesting subscriber to enter a purchase request to buy goods and/or services from a designated merchant;

a merchant subsystem provided at the head end server, the merchant subsystem including a database having a list of merchants correlated with associated sets of accepted payment methods, whereby an individual merchant is willing to accept any one of the accepted payment methods in that merchant's associated set for sale of the goods and/or services;

a subscriber subsystem provided at the head end server, the subscriber subsystem including a database having a list of subscribers correlated with associated sets of personal payment methods, whereby an individual purchaser could use any one of the personal payment methods in that purchaser's associated set to purchase the goods and/or services; and a purchase mediator operable in response to the purchase request to determine an available payment method that is both accepted by the designated merchant and one of the requesting subscriber's personal payment methods, the purchase mediator deriving the available payment method from the set of accepted payment methods in the merchant subsystem that is associated with the designated merchant and the set of personal payment methods in the subscriber subsystem that is associated with the requesting subscriber.

21. An interactive television system as recited in claim 20 wherein:

the available payment method determined by the purchase mediator is displayed as part of the user interface on the television of the requesting subscriber.

22. An interactive television system as recited in claim 20 wherein:

in the event that the purchase mediator derives multiple acceptable payment methods that are both accepted by the designated merchant and coincide with the requesting subscriber's personal payment methods, the multiple acceptable payment methods are displayed as part of the user interface on the television of the requesting subscriber in a prearranged sequence according to the requesting subscriber's preferred order of use for paying for the goods and/or services.

23. An interactive television system as recited in claim 20 wherein:

the purchase mediator resides at the head end server; and
following determination of the available payment method by the purchase mediator, the head end server transfers the available payment method back to the set-top box of the requesting subscriber for display as part of the user interface on the corresponding television.

24. An interactive television system as recited in claim 20 wherein:

the purchase mediator resides at the set-top box of the requesting subscriber; and
the head end server transfers the accepted payment methods obtained from the merchant subsystem and the personal payment methods obtained from the subscriber subsystem back to the set-top box of the requesting subscriber where the purchase mediator locally derives any available payment method.

25. An interactive television system as recited in claim 20 wherein:

the purchase request further includes a purchase amount;
the subscriber subsystem database includes account balances for corresponding personal payment methods for related subscribers; and
the purchase mediator evaluates whether the purchase amount contained in the purchase request exceeds an account balance of the requesting subscriber with respect to any available payment method.

26. An interactive television system as recited in claim 20 wherein:

the subscriber subsystem database includes signing keys for creating unique digital signatures of the subscribers;
the available payment method determined by the purchase mediator is displayed as part of the user interface on the television of the requesting subscriber;
the displayed user interface further provides an option, responsive to selection by the input mechanism for the set-top box, which permits the subscriber to accept or reject transacting the purchase via the available payment method; and
whereupon acceptance of the purchase, the set-top box of the subscriber transmits an acceptance notice to the head end server which then digitally signs on behalf of the requesting subscriber to consummate the sale of the goods and/or services.

27. An interactive television system as recited in claim 20 wherein:

the purchase request further includes a purchase amount;
the subscriber subsystem database includes personal purchase allowances for associated subscribers, each personal purchase allowance being imposed by the subscriber to prevent an expenditure in excess of the personal purchase allowance; and
the purchase mediator evaluates whether the purchase amount contained in the purchase request exceeds a personal purchase allowance associated with the requesting subscriber.

28. An interactive television system as recited in claim 20 wherein:

the purchase request further includes a purchase amount;
the subscriber subsystem database includes personal purchase allowances for associated personal payment methods, each personal purchase allowance being imposed by the subscriber to prevent an expenditure in excess of the personal purchase allowance; and
the purchase mediator evaluates whether the purchase amount contained in the purchase request exceeds a personal purchase allowance associated with a payment method.

29. An interactive television system as recited in claim 20 wherein:

the purchase request further includes a purchase amount;
the personal payment methods of the subscribers have associated spending limits, each spending limit being imposed and maintained by an institution that administers the payment method to prevent an expenditure in excess of the spending limit; and
the purchase mediator communicates with the institution to evaluate whether the purchase amount contained in the purchase request exceeds a spending limit of any available payment method.

30. An interactive television system as recited in claim 20 wherein:

each set-top box and the head end server have associated digital certificates, each digital certificate including a unique public key and a signature from a certifying authority; and
the set-top box of the requesting subscriber and the head end server exchange their respective digital certificates to establish a secure communication path using encryption techniques.

31. A method for electronically transacting a purchase of goods and/or services between a merchant and a purchaser, the purchaser having a set of multiple personal payment methods that can be used to purchase the goods and/or services and the merchant having a set of multiple accepted payment methods that are acceptable for the purchase of the goods and/or services, the method comprising the following steps:

supplying the set of multiple personal payment methods and the set of multiple accepted payment methods to a trusted processor that is independent of, but trusted by, both the merchant and the purchaser; and
deriving, at the trusted processor, an intersection of the sets to yield a common set that comprises any available payment methods that are both accepted by the merchant and can be used by the purchaser for purchase of the goods and/or services.

32. A method as recited in claim 31 wherein:

the deriving step yields a common set that is null of an available payment method; and
the method further comprising denying the purchase of the goods and/or services.

33. A method as recited in claim 31 wherein:

the deriving step yields a common set comprising multiple available payment methods; and the method further comprising presenting the common set of available payment methods to the purchaser for selection of a preferred payment method.

34. A method as recited in claim 33, further comprising the following additional step:

successively presenting individual available payment methods from the common set in a prearranged sequence according to the purchaser's preferred order of use.

35. A method as recited in claim 31, further comprising the following additional step:

preventing access of the merchant to the set of personal payment methods that can be used by the purchaser to purchase the goods and/or services.

36. A method as recited in claim 31, further comprising the following additional step:

verifying that the purchaser has sufficient funds in an account associated with any available payment method from the common set.

37. A method as recited in claim 31, further comprising the following additional step:

attaching a digital signature on behalf of the purchaser to authorize purchase of the goods and/or services using the available payment method.

38. A method as recited in claim 31, further comprising the following additional steps:

permitting the purchaser to impose a purchasing limit to prevent excessive expenditure;

comparing a payment amount for the purchase of the goods and/or services to the purchasing limit; and denying the purchase of the goods and/or services in the event the payment amount exceeds the purchase allowance.

39. A method as recited in claim 31, further comprising the following additional steps:

imposing spending limits in relation to respective ones of the personal payment methods of the purchaser, the spending limits being established by an institution that administers the respective ones of the personal payment methods;

comparing a payment amount for the purchase of the goods and/or services to the spending limit related to the available payment method; and denying the purchase of the goods and/or services in the event the payment amount exceeds the spending limit.

40. A method for facilitating an electronic purchase transaction of goods and/or services between a merchant and a purchaser over an interactive network, the interactive network having distributed processing units, the method comprising the following steps:

storing a list of purchasers at a first processing unit;

storing sets of personal payment methods for corresponding ones of the purchasers, whereby an individual purchaser could use any one of the personal payment methods in that purchaser's corresponding set to purchase the goods and/or services;

storing a list of merchants at the first processing unit;

storing sets of accepted payment methods for corresponding ones of the merchants, whereby an individual merchant is willing to accept any one of the accepted payment methods in that merchant's corresponding set for sale of the goods and/or services;

generating a purchase request for the goods and/or services at a second processing unit, the purchase request identifying a purchaser and a merchant;

transferring the purchase request from the second processing unit to the first processing unit via the interactive network;

indexing the list of purchasers to retrieve the set of personal payment methods that corresponds to the purchaser identified in the purchase request;

indexing the list of merchants to retrieve the set of accepted payment methods that corresponds to the merchant identified in the purchase request; and deriving an intersection of the set of personal payment methods and the set of accepted payment methods to yield a common set that comprises any available payment methods that are both accepted by the merchant and can be used by the purchaser for purchase of the goods and/or services.

41. A method as recited in claim 40, further comprising the following step:

after said deriving step, transferring the common set from the first processing unit back to the second processing unit via the interactive network.

42. A method as recited in claim 40, further comprising the following steps:

before said deriving step, transferring the set of personal payment methods and the set of accepted payment methods from the first processing unit back to the second processing unit; and deriving the intersection of the sets at the second processing unit.

43. A method as recited in claim 40 wherein:

the deriving step yields a common set that is null of an available payment method; and the method further comprising denying the purchase of the goods and/or services.

44. A method as recited in claim 40 wherein:

the deriving step yields a common set comprising multiple available payment methods; and the method further presenting the common set of available payment methods to the purchaser at the second processing unit for selection of a preferred payment method.

45. A method as recited in claim 44, further comprising the following additional step:

successively presenting individual available payment methods from the common set in a prearranged sequence according to the purchaser's preferred order of use.

46. A method as recited in claim 40, further comprising the following additional step:

preventing access of the merchant to the set of personal payment methods that can be used by the purchaser to purchase the goods and/or services.

47. A method as recited in claim 40, further comprising the following additional step:

verifying that the purchaser has sufficient funds in an account associated with any available payment method from the common set.

48. A method as recited in claim 40, further comprising the following additional step:

attaching a digital signature on behalf of the purchaser to authorize purchase the goods and/or services using the available payment method.

49. A method as recited in claim 40, further comprising the following additional steps:

provide purchasing limits in correlation to the purchasers stored at the first processing unit;

comparing a payment amount for the purchase of the goods and/or services to a purchasing limit of the purchaser identified in the purchase request; and denying the purchase of the goods and/or services in the event the payment amount exceeds the purchasing limit.

50. A method as recited in claim 40, further comprising the following additional steps:

providing purchasing limits in correlation to the personal payment methods;

comparing a payment amount for the purchase of the goods and/or services to a purchasing limit associated with a personal payment method; and denying the purchase of the goods and/or services in the event the payment amount exceeds the purchasing limit.

51. A method as recited in claim 40, further comprising the following additional steps:

providing spending limits in relation to respective ones of the personal payment methods of the purchasers stored at the first processing unit, the spending limits being established by an institution that administers the respective ones of the personal payment methods;

comparing a payment amount for the purchase of the goods and/or services to the spending limit related to the available payment method; and denying the purchase of the goods and/or services in the event the payment amount exceeds the spending limit.

52. A method as recited in claim 40, further comprising the following additional step:

securing a communication path between the first and second processing units using encryption techniques.

53. A computer readable medium having computer executable instructions for performing steps comprising:

receiving a set of multiple personal payment methods that can be used by a purchaser to purchase the goods and/or services;

receiving a set of multiple accepted payment methods that are acceptable to a merchant for the purchase of the goods and/or services; and deriving an intersection of the sets to yield a common set that comprises any available payment methods that are both accepted by the merchant and can be used by the purchaser for purchase of the goods and/or services.

54. A system for facilitating electronic purchases of goods and/or services, comprising:

a merchant subsystem resident at a first location and having a database that lists merchants in correlation with associated sets of accepted payment methods, whereby an individual merchant is willing to accept any one of the accepted payment methods in that merchant's associated set for sale of the goods and/or services;

a subscriber subsystem at the first location and having a database that lists subscribers in correlation with associated sets of personal payment methods, whereby an individual purchaser could use any one of the personal payment methods in that purchaser's associated set to purchase the goods and/or services; and a purchase mediator located a second location remote from the first location and coupled to receive a set of accepted payment methods in the merchant subsystem that is associated with a designated merchant and a set of personal payment methods in the subscriber subsystem that is associated with a requesting subscriber, the purchase mediator deriving an intersection of the sets to determine a common set that comprises any available payment method that is both accepted by the designated merchant and is one of the requesting subscriber's personal payment methods.

55. A system as recited in claim 54, wherein the purchase mediator is a trusted component that has been authenticated by a third party certifying authority.

* * * * *